G. A. MITCHELL.
VEHICLE WHEEL.
APPLICATION FILED MAR. 29, 1917.
1,292,504.
Patented Jan. 28, 1919
2 SHEETS—SHEET 1.
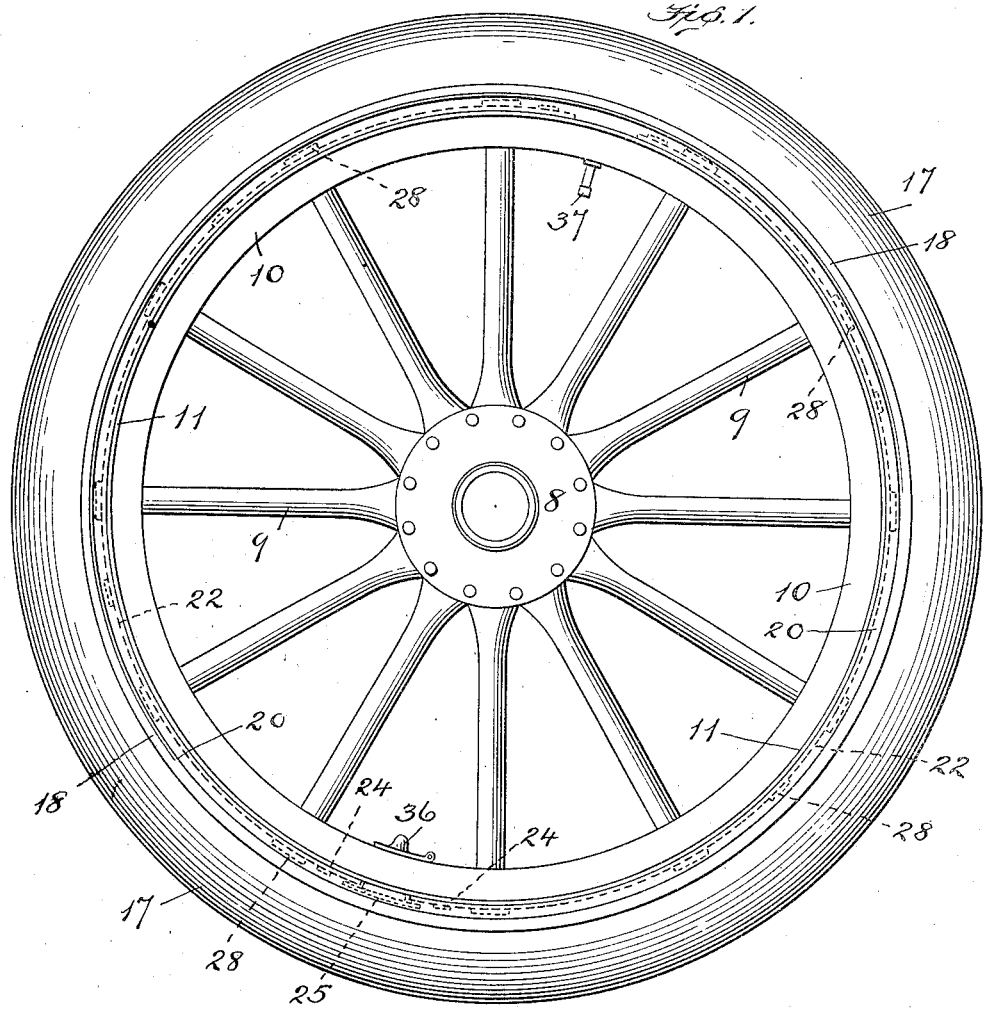
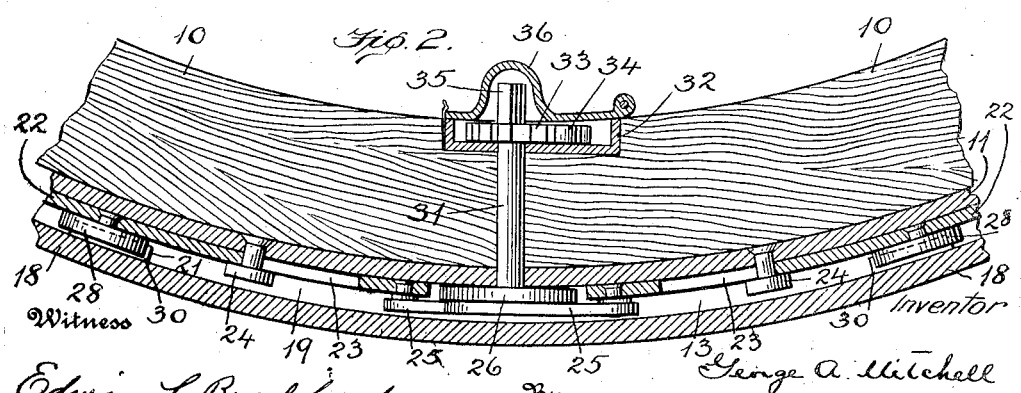

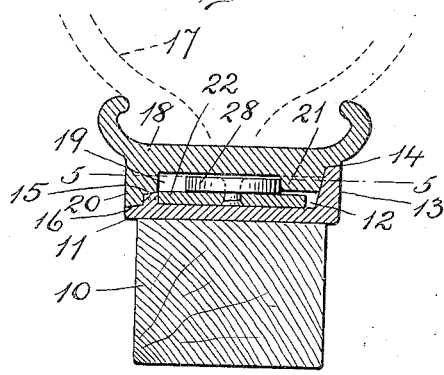
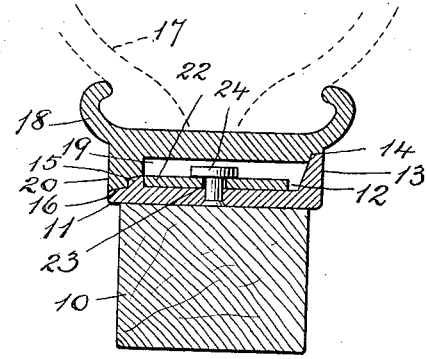
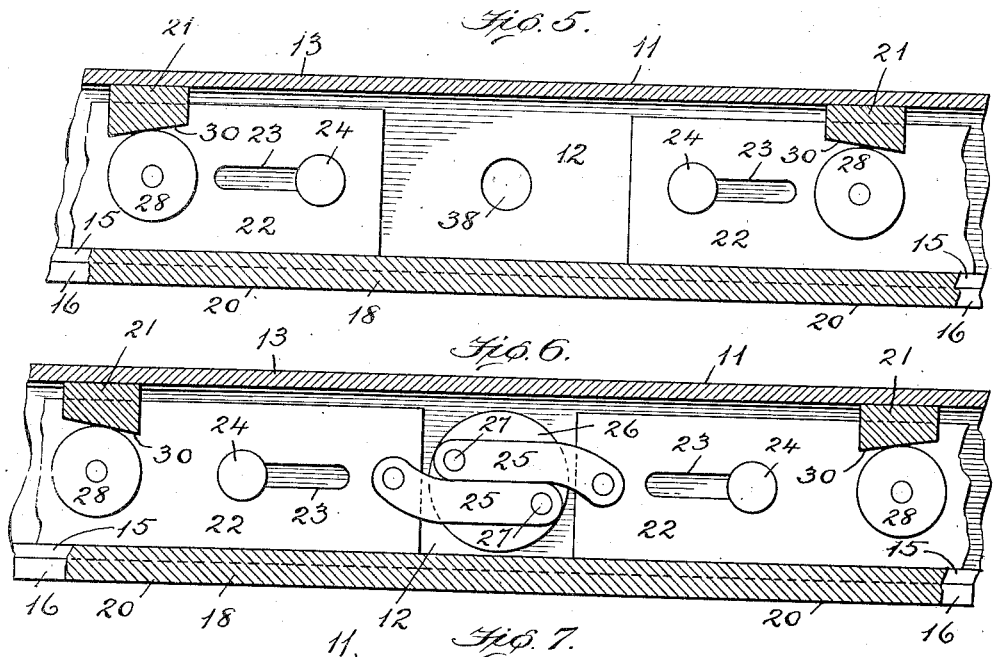
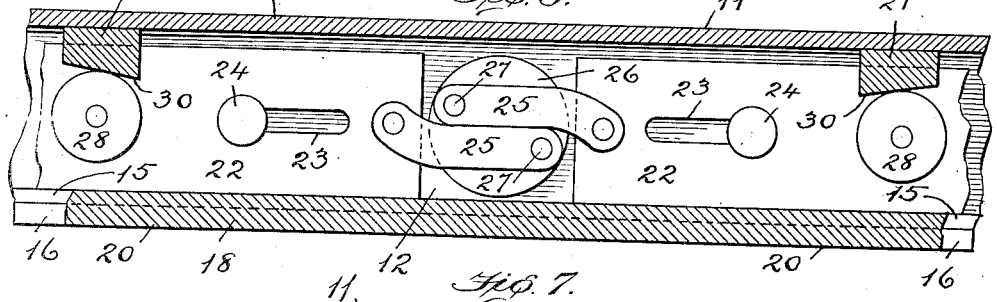
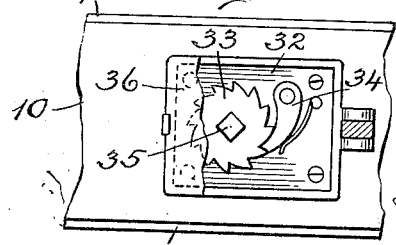

UNITED STATES PATENT OFFICE.

GEORGE A. MITCHELL, OF ABERDEEN, MARYLAND, ASSIGNOR OF ONE-HALF TO HARRY A. GILBERT, OF ABERDEEN, MARYLAND.

VEHICLE-WHEEL.

1,292,504.   Specification of Letters Patent.   Patented Jan. 28, 1919.

Application filed March 29, 1917. Serial No. 158,191.

*To all whom it may concern:*

Be it known that I, GEORGE A. MITCHELL, a citizen of the United States, residing at Aberdeen, in the county of Harford and State of Maryland, have invented certain new and useful Improvements in Vehicle-Wheels, of which the following is a specification.

This invention relates to improvements in vehicle wheels and has reference to such wheels as are employed on motor vehicles wherein, cushion or pneumatic tires are employed.

One object of the invention is to provide an improved wheel structure whereby the demountable rim to which the tire is attached, may be quickly attached to or detached from the rim of the wheel by mechanism that is operated at one point on the wheel, so that the necessity of removing a series of nuts or bolts that are disposed around the entire wheel rim will be avoided.

Another object is to provide improved means to coact between the wheel rim and the demountable rim but extending around the wheel between the two rims whereby the rims may be locked together at a plurality of points but the locking means be actuated from a single point.

With these, and other objects in view, a practical embodiment of the inventive idea is illustrated in the accompanying drawings, wherein,—

Figure 1, shows in side elevation, a wheel embodying the invention.

Fig. 2, illustrates, on an enlarged scale a longitudinal section through a portion of the wheel at the point where the locking means is located and shows the latter in sectional elevation.

Fig. 3, shows a cross-sectional detail through the wheel rim to show the locking devices on the two rims in locked engagement.

Fig. 4, illustrates a similar sectional view taken in a cross-wise direction through the slotted end of one of the segmental bars.

Fig. 5, shows a longitudinal section through the engaged rims at that portion of the wheel where the segmental actuating bars are separated to permit the passage of the inflating tube,—the section being taken in a circumferential direction and on the line 5—5 of Fig. 3.

Fig. 6, illustrates a similar view at the diametrically opposite side of the wheel and shows the inner portion of the actuating devices, and Fig. 7, shows in top plan, a portion of the wheel rim and the devices thereon for actuating the locking means.

Referring to the drawings, by numerals, 8, designates the hub of a wheel from which the spokes 9, radiate and have their outer ends connected to a circular felly 10. The constructions of the hub, spokes and felly, are entirely immaterial to the present invention and may be very different from that illustrated in the drawing.

The felly 10, is encircled by a metal rim 11, which latter is rigidly secured in any suitable manner so that it is permanently attached and remains on the wheel. This permanent rim 11, has an annular channel 12, with an annular stop flange 13, at the inner side of said channel. By preference, this stop flange is provided with a beveled outer edge 14, for a purpose which will presently be explained. At the outer side of the wheel and the rim 11, the latter has an annular stop rib 15, with a beveled outer edge and between said stop rib and the outer edge, said rim has a beveled annular face 16, all for purposes presently to be explained.

The tire or casing 17, is attached to a demountable rim 18, by any well known or suitable means, and this demountable rim has an annular channel 19, around its convex outer side which registers with the annular channel 12, in the permanent rim 11, as clearly shown in Figs. 3 and 4, of the drawing. The demountable rim has at its inner side a beveled seat to receive the beveled surfaces of the stop flange 13, of the permanent rim, and at its outer side said demountable rim is provided with an annular flange 20, with beveled edges to engage the stop rib 15, and also to engage the annular beveled face 16, on the permanent rim 11. At the inner side and projecting in the channel 19, the demountable rim is provided at spaced-apart intervals, with locking lugs 21,—each lug having a beveled inner face 30, as seen best in Figs. 5 and 6, of the drawing. These lugs, when the two rims are in place, project from the demountable rim toward the channel 12, of the permanent rim and have position at the inner side of the stop flange 13, of the permanent rim.

To lock the two rims in place and force their beveled seats into closely locked condition, I provide a means in the channels to engage the locking lugs 21, which will now be described.

In the annular channel 12, and extending circumferentially about the permanent rim 11, are two semi-circular or curved bars 22. By preference each bar has a slot 23, in each of its ends and a headed fastening 24, passes freely through the slot and is riveted or otherwise secured in the permanent rim 11, so as to hold the bars in the channel against bulging but permit them to have a slight circumferential movement, back or forth. By referring to Fig. 6, it will be noted that at one side of the wheel the adjacent ends of the two semi-circular bars 22, are each connected to a link 25, and that these links extend toward each other and are located at one side of a circular head 26. Pivots 27, connect the ends of the links with said head in such a way that when the head is given a partial rotary motion the two links will be moved in opposite directions thereby forcing the ends of the semi-circular bars away from each other and forcing said bars in a circumferential direction around the channel 12. This operation of forcing the bars apart at one end will obviously cause the opposite ends of said bars (shown in Fig. 5) to move toward each other and during this circumferential movement the headed fastenings 24, will serve to hold the ends against bulging while the slots 23, permit the longitudinal movement to take place.

Each semi-circular bar is provided at one side with a series of rollers or equivalent devices 28, which latter are located at spaced-apart intervals around the bars, so that when the bars are given a partial circumferential movement in the channel 12, the rollers, which project in the channel 19, of the demountable rim, will also have a partial circumferential movement in said channel.

The demountable rim, as hereinbefore stated, is provided at spaced-apart intervals with locking lugs 21, which latter have beveled inner faces 30, and these beveled-faced lugs are so positioned that the rollers or other devices 28, on the semi-circular bars 22, may engage said beveled faces and by movement thereagainst, jam or crowd said lugs and the demountable rim from which they project, laterally and in a direction to seat the beveled faces and edges of the two rim-parts into close engagement and thereby rigidly lock the demountable rim and its tire on the permanent rim. Obviously, a reverse movement of the semi-circular bars and rollers will retract the latter and move them from engagement with the beveled faces 30, of the locking lugs and thereby release the demountable rim so it may be pushed laterally and detached from the permanent rim.

It is to be understood that when the circular head 26, and the links 25, are in the position shown in Fig. 6, of the drawing, the semi-circular bars 22, will be drawn toward each other and the rollers 28, will have a locked engagement with the beveled faces 30, of the locking lugs 21, on the demountable rim so as to jam the demountable rim toward the inner side of the wheel and lock it on the permanent rim. Also it will be seen that when the rotary head 26, is partly rotated to move the links 25, in opposite directions and spread them apart, then the semi-circular bars will be moved in a direction to move the rollers 28, from the beveled sides of locking lugs and this movement will be sufficient to shift the rollers to one side of said lugs so as to permit the latter to pass the rollers as the demountable rim is removed from the permanent rim.

In order to conveniently effect a partial rotation of the head 26, I mount the same on the inner end of a stem 31, which latter extends through the wood felly 10, as shown in Fig. 2, of the drawing. At the outer end, this stem passes through a box or case 32, which is permanently attached to the felly, and the projecting end has a small ratchet wheel 33, thereon with which a pawl 34, in the box engages, as clearly shown in both Figs. 2 and 7, of the drawings. The extreme end 35, of this stem is preferably square or angular in cross-section in order that a suitable tool may be engaged therewith to effect a rotation of the stem.

A suitable cover 36, is pivotally attached to the box or case 32, so as to cover the latter and protect the stem, ratchet and pawl, from dirt or damage while the vehicle is in motion.

To permit the passage of the inflating and valved tube 37, I provide an opening 38, through the permanent rim 11, and the usual opening through the wood felly 10.

From the foregoing explanation it will be understood that to detach the demountable rim it is only necessary to raise the cover 36, and rotate stem 31, by engaging the end 35, with a tool, which rotation will actuate the two semi-circular bars so as to retract the rollers or other devices 28, and move them out of the path of the locking lugs 21, whereupon the two rims will be unlocked. The detachment will then be carried out as in the ordinary rim structures by first drawing off that side of the demountable rim which is diametrically opposite the valve and then lift the valve tube out of the opening through the rims.

By means of my invention I am able to dispense with the use of nuts and bolts and the separate operation of each in both removing and attaching the demountable rim and the operation is thereby materially facilitated.

Having described my invention what I claim is,—

1. The combination with a wheel structure having a permanently-attached rim and a demountable rim with an annular channel formed between the confronting faces of the two rims, of spaced-apart locking devices permanently attached to the demountable rim and movable with the latter; bars extending circumferentially in the channel between the rims; locking devices on and movable with said bars, and means connecting the bars whereby the locking devices thereon may be moved circumferentially out of the path of the locking devices on the rim.

2. The combination with a wheel structure having a permanent rim with a channel around its outer circumference and a stop flange at the inner side of said channel, of a demountable rim having a circumferential channel around its inner circumference to register with the channel in the permanent rim and also having a stop flange at its outer side; locking lugs permanently attached to the demountable rim and projecting into the channel at the side of the inner stop flange; two locking bars extending circumferentially in the registering channels; locking devices on said bars, and means for moving the bars circumferentially to move the locking devices to or from the side of the locking lugs.

In testimony whereof I affix my signature in the presence of two witnesses.

GEORGE A. MITCHELL.

Witnesses:
CHARLES B. MANN, Jr.,
LOUIS C. KLERLEIN.